(12) United States Patent
Lehr et al.

(10) Patent No.: US 7,234,704 B2
(45) Date of Patent: Jun. 26, 2007

(54) WIPING AND/OR SEALING ELEMENT AS WELL AS PROCESS FOR SEALING A PISTON AND CLAMPING AND/OR SUPPORT ELEMENT

(75) Inventors: Adolf Lehr, Laubach (DE); Matthias Ehrhardt, Laubach (DE)

(73) Assignee: Ludwig Ehrhardt GmbH (DE)

( * ) Notice: Subject to any disclaimer, the term of this patent is extended or adjusted under 35 U.S.C. 154(b) by 0 days.

(21) Appl. No.: 11/053,611

(22) Filed: Feb. 8, 2005

(65) Prior Publication Data
US 2005/0173867 A1 Aug. 11, 2005

(30) Foreign Application Priority Data
Feb. 9, 2004 (DE) ............ 10 2004 006 369
Nov. 3, 2004 (DE) ............ 10 2004 053 083

(51) Int. Cl.
*B60T 11/236* (2006.01)
*F02F 5/00* (2006.01)

(52) U.S. Cl. .............. 277/436; 277/435; 277/451; 277/452; 277/310

(58) Field of Classification Search ........ 277/466, 277/435, 436, 530, 566, 451, 452, 641, 305, 277/310
See application file for complete search history.

(56) References Cited

U.S. PATENT DOCUMENTS

| | | | | |
|---|---|---|---|---|
| 2,983,533 A * | 5/1961 | Tisch | ............ | 277/649 |
| 3,007,723 A * | 11/1961 | Clarke | ............ | 277/311 |
| 3,542,380 A * | 11/1970 | Klein et al. | ............ | 277/639 |
| 3,622,168 A * | 11/1971 | Woodling | ............ | 277/566 |
| 3,642,293 A | 2/1972 | Woodling | | |
| 3,831,952 A * | 8/1974 | Geffroy | ............ | 277/447 |
| 4,878,766 A * | 11/1989 | Boyd | ............ | 384/130 |
| 5,040,905 A * | 8/1991 | Boyd | ............ | 384/130 |
| 6,145,753 A * | 11/2000 | Yano et al. | ............ | 236/92 B |
| 6,908,070 B2 * | 6/2005 | Bartos et al. | ............ | 251/149.6 |
| 2004/0164496 A1 | 8/2004 | Okada et al. | | |

FOREIGN PATENT DOCUMENTS

EP 1 394 452 A1 3/2004

* cited by examiner

*Primary Examiner*—Patricia Engle
*Assistant Examiner*—Gilbert Lee
(74) *Attorney, Agent, or Firm*—McGlew and Tuttle, PC

(57) ABSTRACT

The present invention pertains to a wiping and/or sealing element for sealing a piston (11) guided movably in a housing (10) with a seal held in a groove (21, 30). The present invention pertains, furthermore, to a process for sealing a movable piston (11) by means of a seal inserted into a groove (21, 30) and a clamping and/or support element with a piston (21), which is guided in a housing (10) such that it can be withdrawn and extended, wherein the piston (11) is sealed by means of a seal arranged in a groove (21). To achieve sealing of the piston (11) with a high sealing force for high liquid pressures at low friction, the wiping and/or sealing element according to the present invention as well as the clamping and/or support element according to the present invention are wherein the seal is a quad ring (22) with a square cross section.

13 Claims, 2 Drawing Sheets

WIPING AND/OR SEALING ELEMENT AS WELL AS PROCESS FOR SEALING A PISTON AND CLAMPING AND/OR SUPPORT ELEMENT

CROSS REFERENCE TO RELATED APPLICATIONS

This application claims the benefit of priority under 35 U.S.C. § 119 of DE 2004 006 369.9 filed Feb. 9, 2004 and DE 10 2004 053 083.1 filed Nov. 3, 2004, the entire contents of each application is incorporated herein by reference.

FIELD OF THE INVENTION

The present invention pertains to a wiping and/or sealing element for sealing a piston guided movably in a housing with a seal held in a groove. Furthermore, the present invention pertains to a process for sealing a movable piston by means of a seal inserted into a groove and a clamping and/or support element with a piston, which is guided in a housing in such a way that it can be withdrawn and extended, wherein the piston is sealed by means of a seal arranged in a groove.

BACKGROUND OF THE INVENTION

Clamping elements in which a workpiece, a tool, a device or a mold is tensioned by means of a piston that can be withdrawn and extended, are known from practice. Likewise, support elements are known from practice, by means of which workpieces that are already tensioned per se are supported to avoid unacceptable deformations at certain points by a piston that can be withdrawn and extended. In machine tools for cutting, in particular, the piston must be sealed in order to prevent cutting oil from penetrating into a housing of the clamping or support element. The cutting oil is often under a high pressure, so that very high requirements are imposed on the seal.

The sealing has hitherto been performed by means of a fixed wiping ring, which keeps away coarse dirt particles, for example, chips. A circular groove, into which a seal is inserted, is recessed into a hole of the wiping ring. This seal, usually an O-ring, ensures the liquid-tight sealing of the piston against the wiping ring. The depth of the groove is selected to be smaller than the diameter of the seal, i.e., for example, of the O-ring. The O-ring is deformed elastically as a result and exerts a normal force on the piston, which ensures tightness. The pressure, which is maintained now at such a level that it ensures sealing, depends on the value of the normal force (pretension of the O-ring) and consequently on the ratio of the groove depth to the O-ring diameter. A low ratio means great deformation of the O-ring and consequently a high normal force (high mechanical pretension of the O-ring) and also great tightness.

It is disadvantageous here that the friction between the piston and the seal also increases proportionally with the normal force because of the coefficient of friction. This may lead to disturbances especially in support elements because of undefined contact forces of the piston against the workpiece.

SUMMARY OF THE INVENTION

Based on this, the basic object of the present invention is to provide a sealing of the piston with strong sealing force for high liquid pressures at low friction.

To accomplish this object, the wiping and/or sealing element according to the present invention as well as the clamping and/or support element according to the present invention are characterized in that the seal is a quad ring with a square cross section.

Such quad rings have a strong sealing force at a low normal force and consequently low friction.

The sealing force of the quad ring can be further increased at equal friction or the friction can be reduced at equal sealing force by arranging the quad ring obliquely in the groove such that a first lip of the quad ring is sealingly in contact with the piston and another lip is sealingly in contact in the groove. The quad ring is consequently arranged somewhat tilted in the groove. The pretension with which the lips are in contact is thus determined by the oblique arrangement, and it is very low. Nevertheless, a high sealing force is obtained.

The above-described oblique arrangement of the quad ring is obtained according to a first exemplary embodiment by rotating the quad ring, after it has been inserted into the groove, around the center of its square cross section. In other words, the cross section of the quad ring is rotated around its imaginary central axis extending over the circumference of the quad ring. As a result, only one lip of the quad ring will come into contact with the piston, and another lip will come into contact with the wall of the groove.

The cross section of the quad ring is preferably rotated by about 90°. As a result, an optimal ratio of friction to sealing force is obtained. Even though rotation by only 90° will take place per se in practice, it is obvious that rotation by an integer multiple of 90° is also possible because of the cross section of the quad ring. The only thing that is important is that one lip is in contact with the piston and at least one lip with one of the groove walls over the entire circumferential area of the piston.

The cross section of the quad ring should be rotated with its inner side facing the piston away from the housing, i.e., in other words, toward the free end of the piston. As a result, cutting oil possibly penetrating into the groove for the quad ring through the gap between the support ring and the piston presses the lip that is in contact with the piston such that the sealing force of the lip is increased as a result. The sealing force of the other lips is also increased as a result, because the quad ring will tend to rotate back.

According to another exemplary embodiment, the oblique arrangement of the quad ring is obtained by the groove for the quad ring being arranged, when viewed in the radial direction of the piston, in such a way that it extends obliquely or is stepped. The only thing that is important in this connection is that an inner lip of the quad ring is arranged higher or lower than an outer lip. In other words, the lips must not be aligned with one another in the radial direction. The shoulder is preferably designed such that it rises outwardly. The quad ring is now tilted with an upper inner lip toward the piston. As a result, cutting oil possibly penetrating into the groove for the quad ring through the gap between the support ring and the piston will press the lip that is in contact with the piston such that its sealing force is increased thereby in this exemplary embodiment as well. As a result, the sealing force of the other lips is also increased because the quad ring will tend to rotate back.

To make possible the good tilting of the quad ring, a top side of the groove located opposite the shoulder may be provided with a relief.

The present invention will be explained in greater detail below on the basis of an exemplary embodiment shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figures 1, 2, 3:
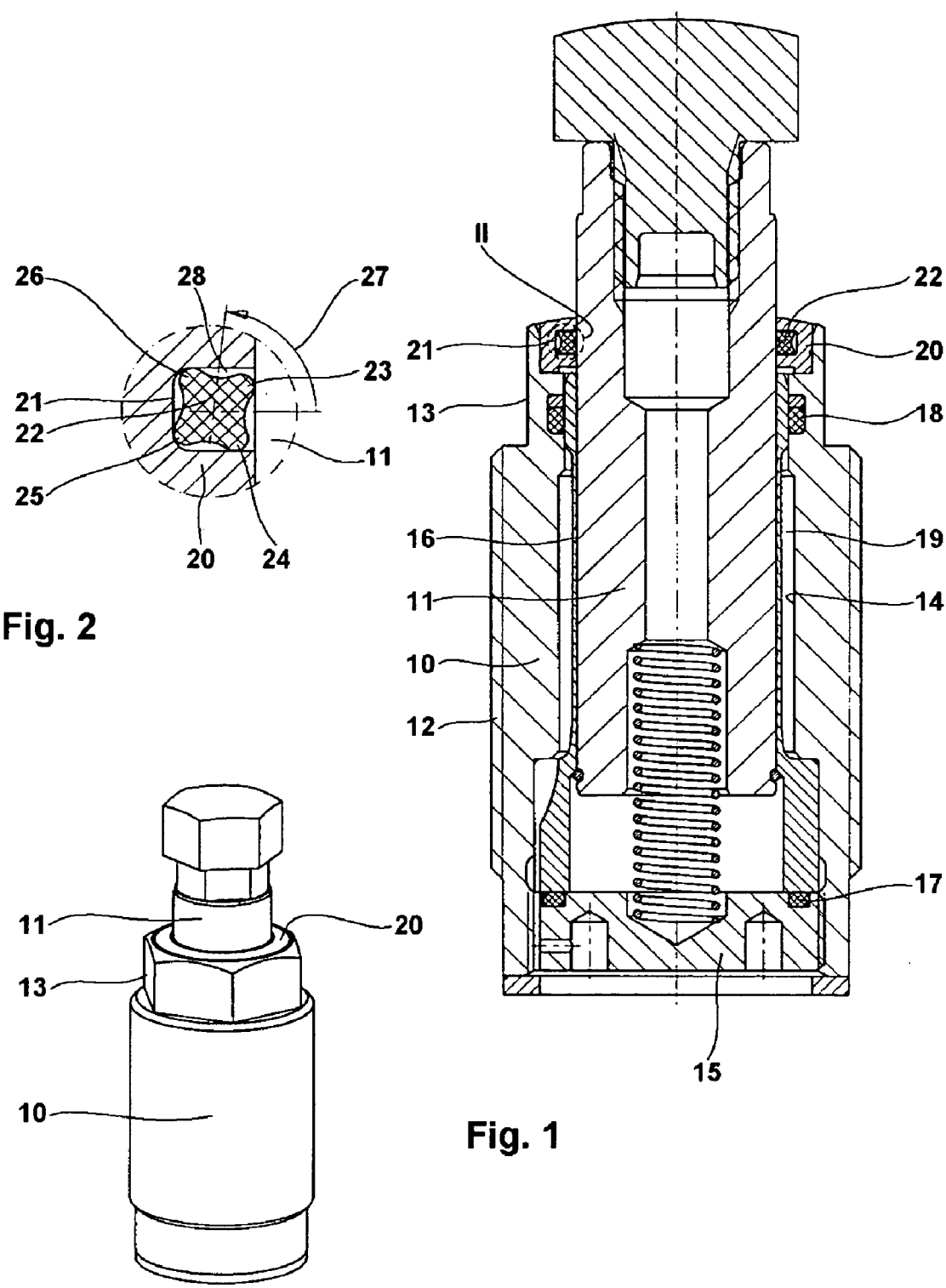
FIG. 1 is a longitudinal sectional view of a support element with the features of the present invention.
FIG. 2 is a longitudinal sectional view of a detail II of the support element according to FIG. 1.
FIG. 3 is a perspective view of a support element.

Referring to the drawings in particular, The support element shown in FIGS. 1 and 3 is used to support a workpiece that is already clamped in a machine tool in order to avoid unacceptable deformations of the workpiece during machining. The support element has a housing 10 and a piston 11, which can be extended and withdrawn. The housing 10 can be fastened to the machine tool, for example, a machine table. This may be carried out, for example, as is shown in FIG. 1, by means of a threaded section 12 on an outer jacket surface of the housing 10. To make it possible to screw the support element or the housing 10 into the machine table, the housing 10 is provided, furthermore, with a hexagon insert bit 13 for usual wrenches.

A stepped hole 14 extending in the longitudinal direction is provided in the housing 10. This hole 14 is closed on one side with a cover 15. Furthermore, a clamping bush 16, which is sealed against the cover 15 on one side and against the housing 10 on the other side (seals 17 and 18), is provided in the hole 14. The clamping bush 16 is provided over part of its length with an outside diameter that is smaller than the inside diameter of the hole 14 in that area. Thus, an annular space 19 is formed between the clamping bush 16 and the hole 14. If the piston 11 has come into supporting contact with the workpiece, a pressurizing agent is admitted into this annular space 19, so that the clamping bush 16 will clamp the piston 11.

A wiping ring 20 is inserted on the front side of the housing 10 located opposite the cover 15. The piston 11, which can be withdrawn and extended, is guided in this wiping ring 20. A groove 21, into which a seal, namely, concretely a quad ring 22, is inserted, is provided on the inner side of the wiping ring 20 facing the piston 11. As can be recognized especially clearly from FIG. 2, the quad ring 22 has an approximately square cross section with four lips 23, 24, 25 and 26. The groove 21 is dimensioned such that the quad ring 22 would exactly fit the groove 21 per se. The edge length of the quad ring 22 formed by the lips 23 . . . 26 consequently fits the depth and the width of the groove 21.

During mounting, the quad ring 22 is inserted into the groove 21 such that it is rotated by about 90°, concretely by nearly 90°. Rotation of the cross section of the quad ring 22 is now performed around an imaginary, circular center line of the cross section. The direction of rotation is selected to be such that the inner side of the quad ring pointing toward the piston 11 is moved away from the housing 10 and the cover 15, i.e, upwardly in the view according to FIG. 1. The exact rotation is shown more specifically by an arrow 27 in FIG. 2.

Due to the rotation of the quad ring 22, only one lip, namely, the lip 23, will come into contact with the piston 11. The other lips 24, 25 and 26 come into contact with a wall each of the groove 21.

The above-described rotation of the quad ring in the direction of rotation described has additionally the following effect: If cutting oil enters a free space 28 above the quad ring 22 under high pressure through the gap between the wiping ring 20 and the piston 11, a dynamic force acting on the lip 23 that is in contact with the piston 11 is generated. This dynamic force tends to rotate the quad ring 22 back, which further increases the pretension of the quad ring 22 against the piston 11 and consequently the sealing force.

Figure 5:
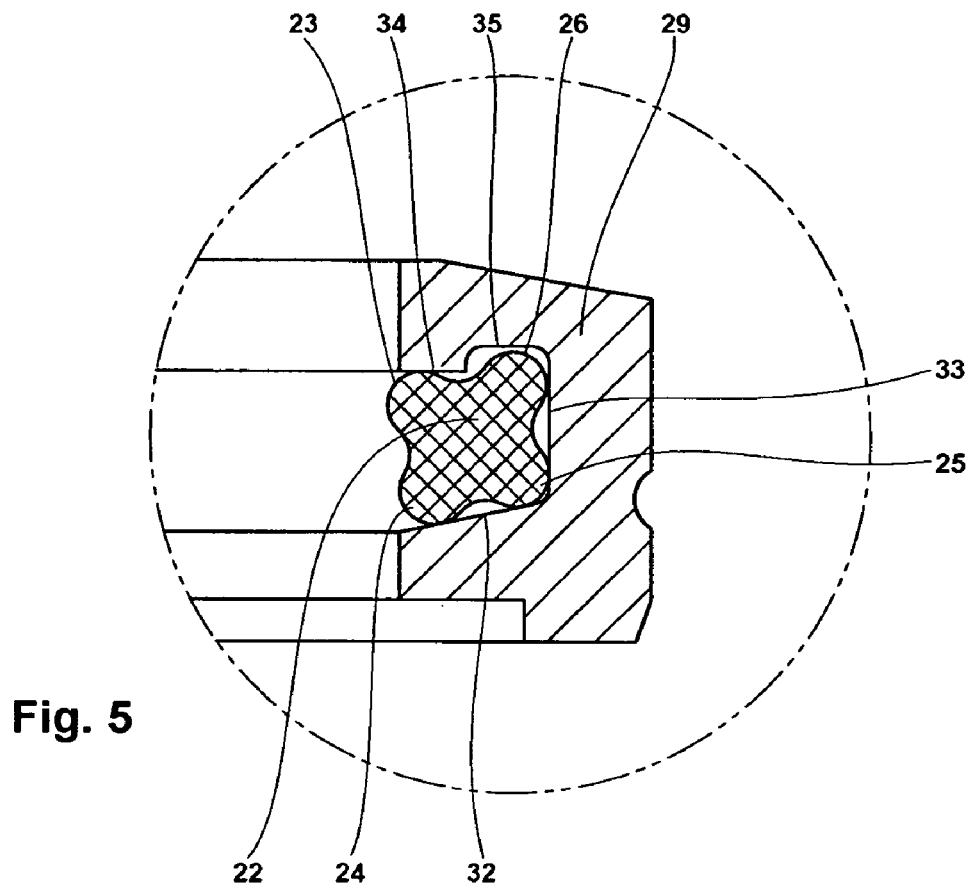
FIG. 5 is a longitudinal view of a detail V of the wiping ring according to FIG. 4.
Figure 4:
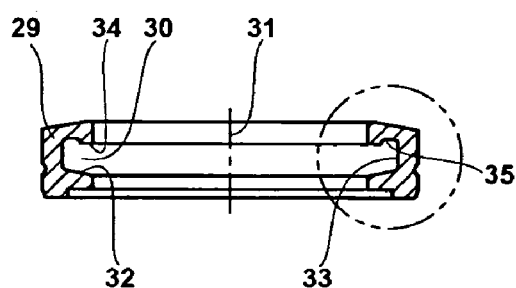
FIG. 4 is a longitudinal sectional view of another exemplary embodiment for a wiping ring for a support element with the features of the present invention.

FIGS. 4 and 5 show another exemplary embodiment of a wiping ring 29, as it can be inserted into the housing 10 as an alternative to the wiping ring 20. A groove 30 arranged on the inner side of the wiping ring 29 facing the piston 11 is designed such that it rises outwardly (radially away from the piston 11) obliquely when viewed in the direction in which the piston 11 is extended. In other words, the groove 30 drops toward the central longitudinal axis 31 of the wiping ring in the direction of the cover 15.

Concretely, the groove 30 is designed such that a shoulder 32, which is a lower shoulder according to the views in FIGS. 4 and 5, drops inwardly, i.e., toward the central longitudinal axis 31. An outer limitation 33 is formed in parallel to the longitudinal central axis 31. A top side of the groove 30 is formed at first with a radially directed upper wall 34, which will then pass over into a relief 35.

The quad ring 22 inserted into the groove 30 is arranged with its top side tilted toward the piston 11 due to the lower, oblique shoulder 32. As in the exemplary embodiment according to FIGS. 1 through 3, only the upper inner lip 23 will essentially come into contact with the piston 11, whereas the other lips 24, 25 and 26 are seated sealingly in the groove 30. The outer upper lip 26 is located now in the relief 35, so that the quad ring 22 can assume an oblique position unhindered. As a result, the same effect is consequently achieved concerning the sealing effect as in the exemplary embodiment according to FIGS. 1 through 3. However, the quad ring 22 does not need to be rotated any longer around the center of its cross section after the insertion into the groove 30, which facilitates mounting.

While specific embodiments of the invention have been shown and described in detail to illustrate the application of the principles of the invention, it will be understood that the invention may be embodied otherwise without departing from such principles.

APPENDIX

LIST OF REFERENCE NUMBERS

| | |
|---|---|
| 10 | Housing |
| 11 | Piston |
| 12 | Threaded section |
| 13 | Hexagon |

APPENDIX-continued

LIST OF REFERENCE NUMBERS

| | |
|---|---|
| 14 | Hole |
| 15 | Cover |
| 16 | Clamping bush |
| 17 | Seal |
| 18 | Seal |
| 19 | Annular space |
| 20 | Wiping ring |
| 21 | Groove |
| 22 | Quad ring |
| 23 | Lip |
| 24 | Lip |
| 25 | Lip |
| 26 | Lip |
| 27 | Arrow |
| 28 | Free space |
| 29 | Wiping ring |
| 30 | Groove |
| 31 | Longitudinal central axis |
| 32 | Shoulder |
| 33 | Limitation |
| 34 | Upper wall |
| 35 | Relief |

What is claimed is:

1. A process for sealing a movable piston, comprising the steps of:
providing a piston housing with means defining a groove having an opening, an opposite groove radially outer limitation, an axially inner shoulder and an axially outer shoulder;
inserting a seal into the groove, the seal being a quad ring with four sides and with four lips, with each side being between adjacent lips;
after inserting said seal into said groove, rotating the cross section around a center of the quad ring such that only one of said lips is in sealing contact with said piston, at least one of said lips is in sealing contact with said axially inner shoulder and at least one of said lips is in sealing contact with said axially outer shoulder; and
moving said piston axially in each of an outer axial direction and an inner axial direction with said one of said lips in sealing contact with said piston, at least one of said lips is in sealing contact with said axially inner shoulder and at least one of said lips is in sealing contact with said axially outer shoulder.

2. A process according to claim 1, wherein:
said rotation is by 90° or an integer multiple of 90°;
one of said axially inner shoulder and said axially outer shoulder is stepped when viewed in a radial direction of the piston to form an axially extending relief;
the other of said axially inner shoulder and said axially outer shoulder extends obliquely from said opening, angled inwardly toward a central longitudinal axis; and
said quad ring is arranged obliquely in said groove such that a first lip of said quad ring is in contact with the piston, another lip is sealingly in contact with said obliquely extending shoulder of said groove and another lip extends into said relief.

3. A process in accordance with claim 1, wherein:
a side of the cross section facing the piston is rotated toward a free end of the piston; and
one of said axially inner shoulder and said axially outer shoulder extends obliquely from said opening, angled inwardly toward a central longitudinal axis.

4. A clamping and/or support element, comprising:
a piston;
a housing, said piston being guided in said housing such that it can be moved in a withdrawn direction and an extended direction relative to said housing, said housing having a groove with an opening open at a piston side and with an adjacent groove shoulder, adjacent to said opening, and an oblique groove shoulder, adjacent to said opening, said oblique groove shoulder extending obliquely from said opening, angled inwardly toward a central longitudinal axis;
a seal arranged in the groove, said seal comprising a quad ring with four sides with four lips, with each side being between adjacent lips, said seal being inserted into said groove to arrange said quad ring obliquely in said groove with a first lip of said quad ring in contact with the piston and another lip sealingly in contact with said groove oblique groove shoulder.

5. An element in accordance with claim 4, wherein said quad ring is rotated around a center thereof by about 90° or an integer multiple of about 90°.

6. An element in accordance with claim 5, wherein said adjacent groove shoulder is stepped when viewed in a radial direction of the piston to form an axially extending relief, said quad ring being arranged obliquely in said groove such that a first lip of said quad ring is in contact with the piston and another lip is sealingly in contact with said obliquely extending shoulder of said groove and another lip extends into said relief, wherein the quad ring is initially inserted into the groove with a side of the cross section facing the piston and said side is subsequently rotated to a final position.

7. A wiping and/or sealing element for sealing a piston guided movably in a housing, the wiping and/or sealing element comprising:
a seal held in a groove of the housing, said seal comprising a quad ring with four sides providing a somewhat square cross section and with four lips, with each side being between adjacent lips, said groove comprising an opening, an opposite groove radially outer limitation, an axially inner shoulder and an axially outer shoulder, one of said axially inner shoulder and said axially outer shoulder extending obliquely from said opening, angled inwardly toward a central longitudinal axis and the other of said axially inner shoulder and said axially outer shoulder being stepped when viewed in a radial direction of the piston to form an axially extending relief, said quad ring being arranged obliquely in said groove such that a first lip of said quad ring is in contact with the piston and another lip is sealingly in contact with said obliquely extending shoulder of said groove and another lip extends into said relief.

8. An element in accordance with claim 7, wherein said obliquely extending shoulder extends toward said recess.

9. An element in accordance with claim 7, wherein said stepped shoulder is at a top side of the groove located opposite said obliquely extending shoulder.

10. A clamping and/or support element, comprising:
a piston;
a housing, said piston being guided in said housing such that it can be moved in a withdrawn axial direction and an extended axial direction, said housing having means defining a groove at a piston side, said groove having a first adjacent groove shoulder, adjacent to said opening, and a second adjacent groove shoulder, adjacent to said opening and having a substantially planar groove radially outer limitation facing said opening; and a seal arranged in said groove, said seal comprising a quad ring with four sides providing a somewhat square cross section with four lips, with each side being between adjacent lips, said quad ring being disposed in said groove with only one lip of said four lips in sealing contact with said piston as said piston moves reciprocally in said housing and at least one other of said four lips being in sealing contact with said groove.

11. An element in accordance with claim 10, wherein said first adjacent groove shoulder extends obliquely from said opening, angled inwardly toward a central longitudinal axis.

12. An element in accordance with claim 11, wherein said second adjacent groove shoulder has a stepped surface that rises from a radially inward location adjacent to said piston to a radially outward location to form an axially extending relief.

13. An element in accordance with claim 12, wherein said axially extending relief is opposite a radially outer end of said obliquely extending shoulder of said groove and two lips of said quad ring are sealingly in contact with said obliquely extending shoulder of said groove and another lip extends into said relief.

* * * * *